UNITED STATES PATENT OFFICE.

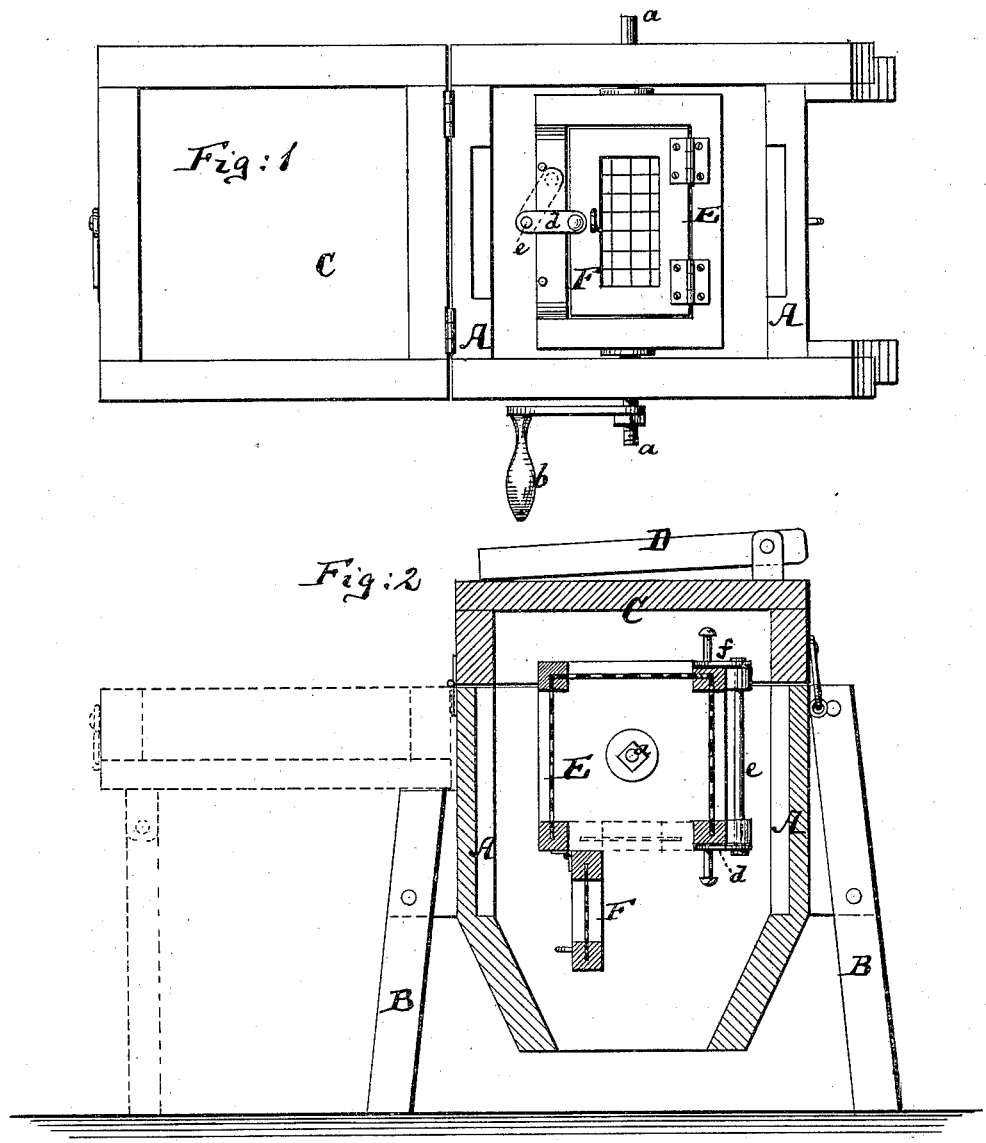

FRANÇOIS CHATELANAT, OF JERSEY CITY, NEW JERSEY.

ASH-SIFTER.

SPECIFICATION forming part of Letters Patent No. 317,974, dated May 19, 1885.

Application filed January 16, 1885. (No model.)

*To all whom it may concern:*

Be it known that I, FRANÇOIS CHATELANAT, a resident of Jersey City, in the county of Hudson and State of New Jersey, have invented an Improved Ash-Sifter, of which the following is a full, clear, and exact description, reference being made to the accompanying drawings, in which—

Figure 1 is a plan or top view of my improved ash-sifter, showing the lid of the sifter-prism on top. Fig. 2 is a vertical cross-section of the same.

This invention has for its object to so construct an ash-sifter that the same can be opened when its lid is down, to discharge its contents downwardly without requiring the attendant to handle the lid at the bottom of the sifter; and the invention consists in the combination, with a prismatic sifter which has a crank for rotating it, and which has on one side a hinged lid, of a shaft hung along one side of said sifter, a catch for holding said lid closed, and a handle, all as hereinafter more fully stated.

In the drawings, the letter A represents the outer case of the ash-sifter, which is supported on legs B, and has a lid, C, that may be rested on a separate leg, D. Within the box A is hung, on trunnions $a$, the sifter proper, E, which is of prismatic form, as shown, and provided with a hinged lid, F, at one side. The sifter E can be revolved by means of a crank-handle, $b$, which is attached to one of the trunnions $a$.

When the apparatus is to be used, the sifter-prism E is so turned as to bring the lid F to the top, as in Fig. 1. The lid is then opened, ashes and cinders are put in, and the lid is then closed, whereupon the sifter-prism is revolved within the closed case A C to sift out the ashes. After the ashes have been sifted out, when it is desired to dump the remaining cinders, it is necessary to open the lid F when the same is at the bottom, as in Fig. 2.

My invention, as already stated, relates to the means of closing and opening this lid F. This means consists of a catch, $d$, which is attached to one end of a shaft, $e$, that is hung in bearings along one side of the sifter-prism, and which shaft at the opposite end carries a handle or crank, $f$, all as shown in Fig. 2. It will be seen from Fig. 2 that this locking contrivance $d\,e\,f$ straddles two sides of the sifter-prism. When the lid F is to be closed, all the attendant has to do is to swing the catch $d$ part way over the lid, as in Fig. 1. To this end the catch is of such form that it can be easily grasped by the hand. When the lid is at the bottom and is to be opened, all that is necessary is for the attendant to turn the crank $f$, which is now at the top, and thereby swing the catch $d$ away from under the lid F, allowing the latter to drop, which it will readily do, being loaded with the cinders. Thus the attendant can control the whole operation from the upper part of the sifter-prism, and will be saved the annoyance of undue exposure to the dust and ashes. It is evident that the catch $d$ and handle $f$ are both rigidly secured upon the shaft $e$.

I claim—

The combination of the prismatic sifter E, provided with the hinged lid F and the crank-handle $b$ for revolving it, with the shaft $e$, hung along one of the sides of said sifter, and provided with the catch $d$ and handle $f$, the said catch and handle being rigidly attached to opposite ends of said shaft and adapted to open and close the lid, substantially as described.

FRANÇOIS CHATELANAT.

Witnesses:
CHARLES G. M. THOMAS,
HARRY M. TURK.